US010127324B2

United States Patent
Ding et al.

(10) Patent No.: US 10,127,324 B2
(45) Date of Patent: Nov. 13, 2018

(54) DYNAMICALLY INTEGRATING OFFLINE AND ONLINE SUGGESTIONS IN A GEOGRAPHIC APPLICATION

(71) Applicant: GOOGLE INC., Mountain View, CA (US)

(72) Inventors: Yiyang Joy Ding, San Francisco, CA (US); Kevin Michael Grennan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 445 days.

(21) Appl. No.: 14/743,477

(22) Filed: Jun. 18, 2015

(65) Prior Publication Data
US 2015/0370811 A1  Dec. 24, 2015

Related U.S. Application Data

(60) Provisional application No. 62/015,427, filed on Jun. 21, 2014.

(51) Int. Cl.
*G06F 17/30* (2006.01)
(52) U.S. Cl.
CPC ...... *G06F 17/3087* (2013.01); *G06F 17/3053* (2013.01); *G06F 17/30864* (2013.01)
(58) Field of Classification Search
CPC ............. G06F 17/3087; G06F 17/3053; G06F 17/30864
USPC .................................................. 707/706, 724
See application file for complete search history.

(56) References Cited

U.S. PATENT DOCUMENTS

| | | | |
|---|---|---|---|
| 7,609,663 B2 * | 10/2009 | Neuhaus ........... | H04L 29/06027 370/312 |
| 8,126,895 B2 | 2/2012 | Sargent et al. | |
| 8,458,161 B2 * | 6/2013 | Schneider ......... | H04L 29/12594 707/706 |
| 8,645,825 B1 | 2/2014 | Cornea et al. | |
| 9,116,940 B1 * | 8/2015 | Gupta ................. | G06F 17/3053 |

(Continued)

FOREIGN PATENT DOCUMENTS

| | | |
|---|---|---|
| EP | 2 053 526 A1 | 4/2009 |
| WO | WO-2012/078360 A1 | 6/2012 |

OTHER PUBLICATIONS

Google, "Mobile Maps," (2015). Retrieved from the Internet at: URL:https://www.google.com/maps/about/.

(Continued)

*Primary Examiner* — Monica Pyo
(74) *Attorney, Agent, or Firm* — Marshall, Gerstein & Borun LLP

(57) ABSTRACT

An initial sequence of one or more symbols is received via a user interface. An attempt is made to send a request for online suggestions to a network server via a communication network, the request including at least one symbol in the initial sequence. When the initial sequence is less than n symbols long, and if no response to the request is received, the initial sequence is displayed without generating offline suggestions. When the initial sequence is at least n symbols long, and if no response to the request is received within a predetermined period of time, offline suggestions consistent with the initial sequence are generated using offline geospatial data stored in the computing device, and the offline suggestions are provided via the user interface.

20 Claims, 4 Drawing Sheets

(56) References Cited

U.S. PATENT DOCUMENTS

| | | | |
|---|---|---|---|
| 9,424,357 B1* | 8/2016 | Hotchkies | G06F 17/30867 |
| 9,529,924 B2* | 12/2016 | Grant | G06Q 30/0256 |
| 9,626,081 B2* | 4/2017 | Blanco | G06F 17/3087 |
| 9,675,890 B2* | 6/2017 | Ahiska | A63F 13/77 |
| 2002/0161519 A1* | 10/2002 | Mori | G01C 21/3407 |
| | | | 701/410 |
| 2006/0041581 A1* | 2/2006 | Aghvami | G06Q 10/10 |
| 2008/0242343 A1* | 10/2008 | Koh | H04M 1/27455 |
| | | | 455/550.1 |
| 2011/0071862 A1* | 3/2011 | Cator | G06Q 10/02 |
| | | | 705/5 |
| 2012/0215369 A1* | 8/2012 | Desai | G06Q 10/06 |
| | | | 700/291 |
| 2013/0282749 A1 | 10/2013 | Batraski et al. | |

OTHER PUBLICATIONS

Liu et al., "Listen, Look, and Gotcha: Instant Video Search with Mobile Phones by Layered Audio-Video Indexing," ACM, 887-896 (2013).

International Search Report and Written Opinion for Application No. PCT/US2015/036446, dated Sep. 28, 2015.

Extended European Search Report for Application No. 15173013.2, dated Oct. 12, 2015.

* cited by examiner

DYNAMICALLY INTEGRATING OFFLINE AND ONLINE SUGGESTIONS IN A GEOGRAPHIC APPLICATION

CROSS-REFERENCE TO RELATED APPLICATION

This application to U.S. Provisional Patent Application. No. 62/015,427, filed on Jun. 21, 2014, and titled "Dynamically Integrating Offline and Online Suggestions in a Geographic Application," the entire disclosure of which is hereby expressly incorporated by reference herein.

FIELD OF TECHNOLOGY

This disclosure relates to interactive digital maps and, more particularly, to managing offline map data in client devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications that provide interactive digital maps, driving directions, and various geographic functions ("geographic applications") can operate on computing devices that generally have a permanent network connection as well as on portable devices such as smartphones, tablet computers, car navigation systems, etc., which typically rely on a network connection. In addition to providing interactive digital maps, some geographic applications provide other types of geospatial data, such as information about businesses at various geographic locations, descriptions of points of interest, navigation directions, etc. For example, a geographic application operating on a portable device can receive a geographic query such as "gas stations nearby," transmit the search query to a network server, and display the search results via the user interface of the portable device.

SUMMARY

A digital geographic application operating in a portable device such as a smartphone provides offline geospatial suggestions using offline data stored in the memory of the portable device, when the portable device cannot reach a network server sufficiently quickly or at all. The portable device can provide offline geospatial suggestions in response to completed user input, such as the string "gas stations" followed by the actuation of the "return" or "submit" key, for example, as well as in response to partial user input. An initial sequence of one or more symbols that make up the partially completed user input are referred to below as "search prefix." For example, the portable device can provide geospatial suggestions after the user has input "Chi," provide new geospatial suggestions after the user has input "Chic," etc. When the portable device has a sufficiently reliable connection to the network server, the geographic application receives online geospatial suggestions from the network server. Further, the geographic application dynamically merges online suggestions with offline suggestions when online suggestions arrive within a certain period of time after the offline suggestions are displayed. Still further, to balance the lower quality of offline suggestions with latency associated with retrieving online suggestions, the geographic application can display offline suggestions only when the length of the search prefix exceeds a certain number n, where n is three, four, or any other suitable number.

More particularly, one implementation of these techniques is a method in a computing device for dynamically integrating offline and online suggestions. The method includes receiving, via a user interface, an initial sequence of one or more symbols, and attempting to send a request for online suggestions to a network server via a communication network, the request including at least one symbol in the initial sequence. When the initial sequence is less than n symbols long, the method includes displaying the initial sequence without generating offline suggestions if no response to the request is received. When the initial sequence is at least n symbols long, the method includes (i) generating, by the one or more processors, offline suggestions consistent based at least in part on the offline geospatial data, and (ii) providing the offline suggestions via the user interface, if no response to the request is received within a certain period of time.

Another implementation is a method in a portable computing device for integrating offline and online suggestions. The method includes receiving, via a user interface, a search prefix including an initial sequence of one or more symbols, attempting to send a request for suggestions to a network server, the request including the search prefix, and activating a first timer upon attempting to send the request for suggestions. If the first timer expires prior to receiving a response to the request, the method includes (i) generating offline suggestions based at least in part on the initial sequence using offline data stored in the computing device, and (ii) activating a second timer. The method further includes merging the requested online suggestions with the offline suggestions, if the requested suggestions arrive from the network server before the second timer expires.

Yet another implementation is a portable computing device including one or more processors, a user interface, a network interface to communicatively couple the portable computing device to a network server via a communication network, in an online mode, and a non-transitory computer-readable memory coupled to the one or more processors. The memory stores a geographic application configured to (i) receive, via the user interface, an initial sequence of one or more symbols, (ii) attempt to send a request for suggestions to the network server, the request including at least one symbol in the initial sequence, (iii) activate a first timer upon attempting to send the request for suggestions, and, if the first timer expires prior to receiving a response to the request, (a) generate offline suggestions based at least in part on the initial sequence using offline data stored in the computing device, and (b) activate a second timer. The geographic application is further configured to (iv) merge the requested online suggestions with the offline suggestions, if the requested suggestions arrive from the network server before the second timer expires.

DETAILED DESCRIPTION OF THE DRAWINGS

Overview

Figure 1:
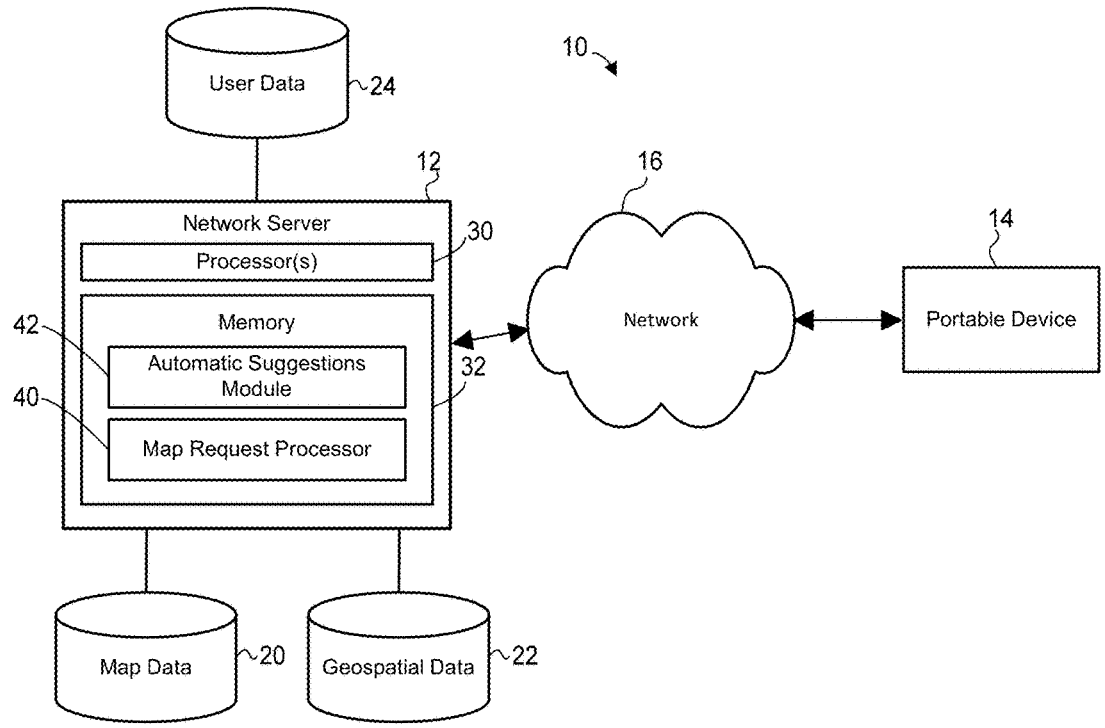
FIG. 1 is a block diagram of an example system in which a client device dynamically integrates online and offline suggestions, in accordance with the techniques of this disclosure.

As a user inputs a geographic query using a portable device, a geographic application of this disclosure attempts to provide substantially real-time automatic geospatial suggestions. The geospatial suggestions can include, for example, geographic search terms, names of places, or endpoints for driving directions. The geographic application in some cases can provide offline geospatial suggestions using geospatial data stored in a memory of the portable device, and in other cases provide online geospatial suggestions generated at a network server.

More particularly, when the geographic application determines that no network connection, or only a limited network connection, is available by querying the operating system of the portable device, for example, the geographic application generates offline automatic suggestions using offline geospatial data stored in a memory of the portable device. In some implementations, to avoid providing suggestions that have a low probability matching the user's intent, the geographic application may provide offline suggestions only when the length of the initial sequence of symbols the user has input is larger than a certain number n (e.g., 3).

When the network connection appears to be available based on the result of querying the operating system and/or other indicators, the geographic application attempts to retrieve automatic suggestions from a network server. The geographic application can activate a relatively short timer (e.g., 100 ms) to demarcate the predetermined time period during which the geographic application awaits suggestions from the network server and does not display offline suggestions. If no suggestions are received from the network server upon expiration of the timer, the geographic application generates and displays offline suggestions. If suggestions arrive from the network server shortly thereafter, the geographic application merges these online suggestions with the offline suggestions already being displayed. In some implementations, the geographic application activates another, longer timer (e.g., 3 seconds) for a predetermined period of time during which online suggestions can be merged with offline suggestions.

When the geographic application merges online and offline suggestions, the geographic application can display some of the offline suggestion along with the online suggestions, at the same time. Further, when the same item is included in the offline suggestions and the online suggestions, with the online suggestions providing additional details for the item, the geographic application can expand the already-displayed indication of the item to include the additional details.

When offline suggestions are being displayed, the geographic application can provide an appropriate indicator to the user. The geographic application also provide an interactive control using which the user can re-activate the longer timer and cause the geographic application to again attempt retrieving online suggestions.

In this manner, the digital geographic module implements an approach that balances high quality of network-based suggestions with latency in providing these suggestions to the user.

Overview of an Example System and Portable Device

FIG. 1 illustrates an example system 10 in which a portable device 14 generates offline suggestions and dynamically merges the offline suggestions with online suggestions. The client device 14 is communicatively coupled to a network server 12 via a communication network 16, which can be any suitable network including wired and/or wireless links. For simplicity, FIG. 1 illustrates only one instance of a network server 12. However, the network server 12 in other implementations can include multiple servers capable of communicating with each other, arranged according to any suitable topology. Similarly, the system 10 in general can include any number of portable and non-portable devices similar to the portable device 14.

The server 12 can include one or more processor(s) 30 coupled to a memory 32, which can be a non-transitory computer-readable memory including persistent and/or non-persistent components. A map request processor 40 and an automatic suggestions module 42 can be implemented as sets of instructions stored in the memory 32 and executed on the one or more processor(s) 30. In operation, the map request processor 40 and the automatic suggestions module 42 can provide map data for rendering a digital map of a geographic areas and geospatial suggestions, respectively, to the client device 14.

The server 12 is coupled to a map database 20, which can be implemented in one or several servers (or, if desired, as a component of the network server 12). The map database 20 can store descriptions of geometry and location indications for various natural geographic features (e.g., rivers, mountains, forests) as well as artificial geographic features (e.g., roads, buildings, parks). The map data can include, among other data, vector graphics data, raster image data, and text data. In an example implementation, the map database 20 organizes map data into map tiles, which generally correspond to a two-dimensional organization of geospatial data into a quadtree (a tree data structure in which each node has at most four children). In other implementations, other tree and/or non-tree data structures can be used to organize map tiles. Each map tile can correspond to a square geographic region, with the size of the square being dependent on the level of magnification, or zoom level. Thus, each map tile at a given zoom level is divided into four tiles at the next level, up to the highest zoom level. The map request processor 40 can receive, from the client device 14, a request for a certain location or area and an indication of the desired zoom level, identify a set of map tiles necessary for rendering a digital map of the corresponding area at the specified zoom level, and transmit the map tiles to the client device 14.

Further, the server 12 is coupled to a geospatial database 22 that stores geospatial data, or data with geographical or geospatial properties. These geographical or geospatial properties can include indications of locations in any suitable global positioning scheme such as Global Positioning Service (GPS) coordinate system and/or location positioning scheme, such as a local coordinate system defined relative to a certain point. The geospatial properties additionally or alternatively can include street address information, landmark proximity indications, and other suitable indications of location.

The information in the geospatial database 22 can describe points of interest, brick-and-mortar businesses, user reviews, etc. For example, the geospatial database 22 can include a description of a movie theater, with the description including the name of the movie theater (e.g., "The Music Box"), an indication of the location (e.g., the GPS coordinates of the centroid of the building or of the main entrance), an indication of the price range (e.g., "$12," "student discount," "matinee discount"), a link to the website of the theater, and other data potentially helpful to users. The automatic suggestions module 42 can use the geospatial database 22 when providing geospatial suggestions to the portable device 14. Also, when the user submits a completed query, the network server 12 can use the geospatial database 22 to generate a response.

With continued reference to FIG. 1, the server 12 also can access a user database 24 storing user data specific to users of various client devices, such as the client device 14. For a certain user, the user data can indicate recent geospatial queries, frequent geographic queries and/or frequent themes, the user's home location, her work location, etc. The automatic suggestions module 42 can generate accurate and relevant geospatial suggestions for a user in view of the user-specific information stored in the user database 24. In some implementations, the user operates certain controls and/or installs certain applications to allow the server 12 and/or the client device 14 to utilize the user's data in this manner.

Figure 2:
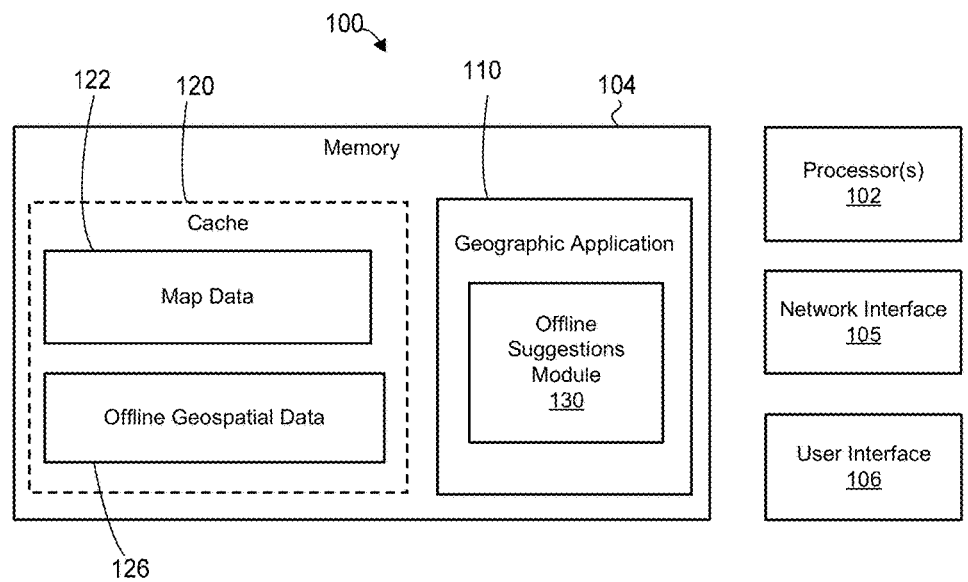
FIG. 2 is a block diagram of an example client device that can operate in the system of FIG. 1.

FIG. 2 is a block diagram illustrating an example implementation of the client device 100, which in some implementation corresponds to the client device 14 of FIG. 1, for example. The client device 100 can be any suitable portable device that relies on a network connection to retrieve map data for generating an interactive digital map. The client device 100 can be, for example, a laptop computer, a smart phone, or a tablet computer. Further, the client device 100 can be a desktop computer with intermittent internet access. Still further, the client device 100 can be a navigation device used in an automotive environment, implemented as a physically separate device or being embedded in the head unit of the vehicle. The client device 100 includes one or more processor(s) 102, a computer-readable memory 104, a network interface 105, and a user interface 106. In some implementations, the one or more processor(s) 102 include a central processing unit (CPU) as well as a graphics processing unit (GPU) for efficiently rendering graphics content. The user interface 106 can include such components as, for example, a screen, a touchscreen, a keyboard, a microphone, one or more speakers, etc. The memory 104 can be a non-transitory memory including persistent (e.g., flash drive) and/or non-persistent (e.g., RAM) components.

The memory module 104 stores instructions that implement a geographic application 110, which can be a special-purpose mapping/navigation application or a general-purpose application such as a web browser that includes a mapping application programming interface (API), for example. The memory module 104 also implements a cache 120 for storing map data 122 in the form of tiles, for example, as well as offline geospatial data 126, which can be organized using any suitable data structure (e.g., a tree or a set of tables) and indexed using any suitable technique.

The geographic application 110 includes an offline suggestions module 130 (e.g., as one or several software routines) that can determine when the geographic application 110 should attempt to generate offline geospatial suggestions using the offline geospatial data 126, generate offline suggestions, activate and monitor timers related to attempts to retrieve online geospatial suggestions, and merge online suggestions with online suggestions.

In some cases, the geographic application 110 can generate online suggestions based on data selected at a network server and transmitted to the client device 100. In other words, the geographic application 110 in some cases can receive "raw" data from the network server and use the received data to locally generate online geospatial suggestions. Further, in some cases the geographic application 110 may receive data from the network server and use the received data along with the offline data to generate suggestions, which in this application are also referred to as online geospatial suggestions. More generally, geospatial suggestions that are at least partially based on data received from the network server for a certain search prefix, subsequently to the search prefix being input at the client device 100, are referred to herein as online geospatial suggestions.

Example Methods for Merging Online and Offline Geospatial Suggestions

Example operation of the geographic application 110 and the offline suggestions module 130 is discussed next. In particular, a general method for determining when offline suggestions should be generated and when online suggestions should be merged with offline suggestions is discussed with reference to FIG. 3, and a method for dynamically determining when offline suggestions should be generated in view of the length of the search prefix is discussed with reference to FIG. 4.

Figure 3:
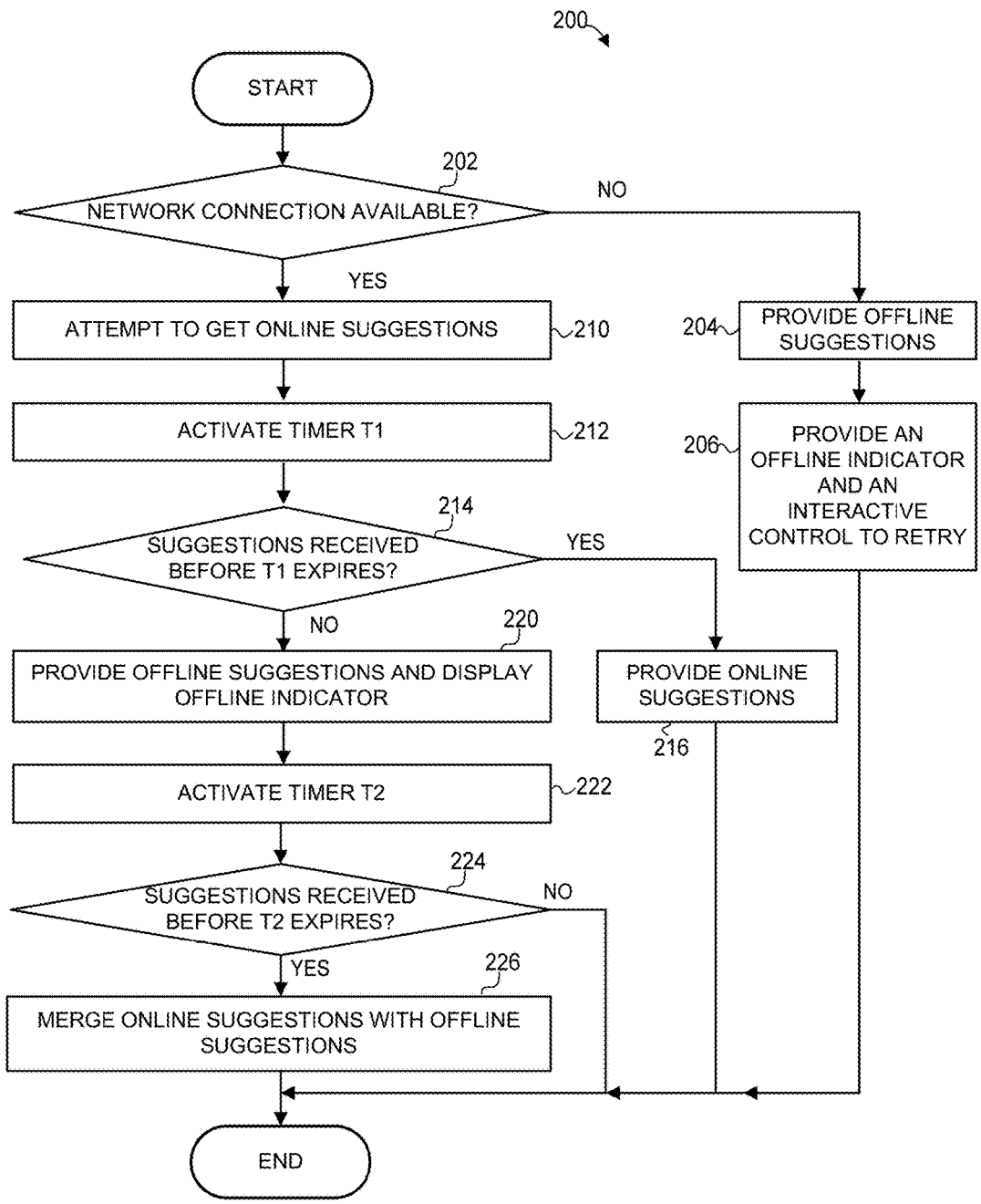
FIG. 3 is a flow diagram of an example method for integrating online and offline suggestions, which can be implemented in the client device of FIG. 2.

Referring first to FIG. 3, a method 200 can be implemented in the geographic application 110 as a set of software instructions executable on the processor(s) 102, for example. For example, at least some of the blocks illustrated in FIG. 3 can be implemented in the offline suggestions module 130. For example, the offline suggestions module 130 can execute the functionality of blocks 204, 206, 220, and 226, and the other blocks can be executed by other components of the geographic application 110. In another implementation, the offline suggestions module 130 can implement all of the blocks illustrated in FIG. 3. More generally, however, the method 200 can be implemented in one or several software components in any suitable portable device.

The method 200 begins at block 202 with a determination of whether a network connection is available. To this end, the method 200 can invoke an API exposed by the operating system of the portable device. It is noted that a portable device, such as the portable device 14 of FIG. 1 or the portable device 100 of FIG. 2, in some cases can determine that no network connection is currently available with a high degree of accuracy. On the other hand, when the portable device determines that a network connection is available, it is difficult for the portable device to predict how quickly a certain message will reach a network node, and how quickly a response will arrive at the portable device.

According to the method 200, if it is determined that no network connection is available, the flow proceeds to block 204, where offline suggestions are provided. As discussed in more detail below, whether offline suggestions are generated in some implementations further depends on the length of the search prefix. In addition to providing offline suggestions, the method 200 can include providing an offline indicator to notify the user that the geospatial suggestions were not received from a network server (block 206). The offline indicator can be, for example, an icon or a text message. Further, the method 200 can include providing an interactive control for requesting that the geographic application make another attempt to receive online geographic suggestions (block 206). The interactive control can be an interactive icon, a special-purpose key, or a key generally serving another purpose, such as the search key, activated in a particular manner (e.g., by a double tap). After block 206 is executed, the method 200 completes. It is noted, however, that the method 200 can be invoked every time the user enters a new symbol.

If it is determined at block 202 that a network connection is probably available, the flow proceeds to block 210, where an attempt to send a request for online suggestions is made. The request can be a message that includes the search prefix (e.g., "S" in the first instance of the message, "Sa" in the second instance of the message, "San" in the third instance, etc.), as well as an indication of the current context (e.g., navigation or search). In an alternative implementation or scenario, the request includes only the last symbol the user added to the search prefix, so that in the first instance the message includes "S," in the second instance the message includes only "a" corresponding to the search prefix "Sa," etc. In some cases, the geographic application will fail to send the request due to lack of connectivity. In other cases, however, the geographic application initially may succeed at sending the message to a network server, but the message will not arrive at the network server in time or at all. Accordingly, timer T1 is activated at block 212.

Timer T1 can correspond to a relatively short period of time, such as 100 ms, for example. If online suggestions are received before timer T1 expires (block 214), the flow proceeds to block 216, where online suggestions are provided via a user interface. The network server can provide online suggestions in the form of an ordered list, for example, in which various search terms are listed in the order of probability. To continue with the example above, the suggestions for a certain user corresponding to search prefix "San" can include "San Francisco" with the probability 0.9, "San Jose" with the probability 0.8, etc. The network server can generate these suggestions using any suitable combination of signals, such as popularity of the suggested item, proximity of the suggested item to the user's current location, the user's previous searches and/or reviews, etc. In some of these implementations, the user operates certain controls and/or installs certain applications to allow the network server to utilize the user's data in this manner. Once the online suggestions have been provided, the method 200 completes.

If no suggestions are received before timer T1 expires (block 214), the flow proceeds to block 220, where offline suggestions are provided via the user interface. In some cases, an offline indicator is activated as well. Similar to block 204 discussed above, the generation of offline suggestions may further depend on the current length of the search prefix.

At block 222, timer T2 can be activated to monitor arrival of "late" online suggestions. Timer T2 can be substantially longer than timer T1. For example, timer T2 can be two or three seconds long. When timer T2 expires, the method 200 determines whether online suggestions have been received (block 224). The method 200 completes if no late online suggestions arrived during the timer interval corresponding to timer T2. Otherwise, online suggestions are merged with offline suggestions (block 226). More particularly, offline suggestions can be compared with online suggestions to detect overlaps.

As one example, when the same suggested term occurs in the offline suggestions and in the online suggestions, additional details included in the online suggestions can be seamlessly added to the already-displayed item. For example, offline suggestion "Tokyo" for search prefix "Tok" can be expanded using the online suggestion for the same item to also include the Japanese characters for "Tokyo." As another example, an online suggestion ranking between two offline suggestions matching online suggestions can be inserted into the list being displayed via the user interface. As yet another example, a list of offline suggestions can be augmented with one or more online suggestions not present in the offline suggestions.

In some implementations, respective indications may be stored for some of the offline suggestions to indicate that these offline suggestions are considered sufficiently reliable, and do not require an update.

It will be understood that any suitable acknowledgement can be used to exchange data between a client device and a network server. In some implementations, for example, timer T1 and/or timer T2 expires only if no acknowledgement to the request is received within a predetermined period of time. If an acknowledgement is received, the timer may be extended or another timer can be activated. In another implementation, however, timer T1 and/or timer T2 expires if no suggestions are received, regardless of whether the request is acknowledged.

Figure 4:
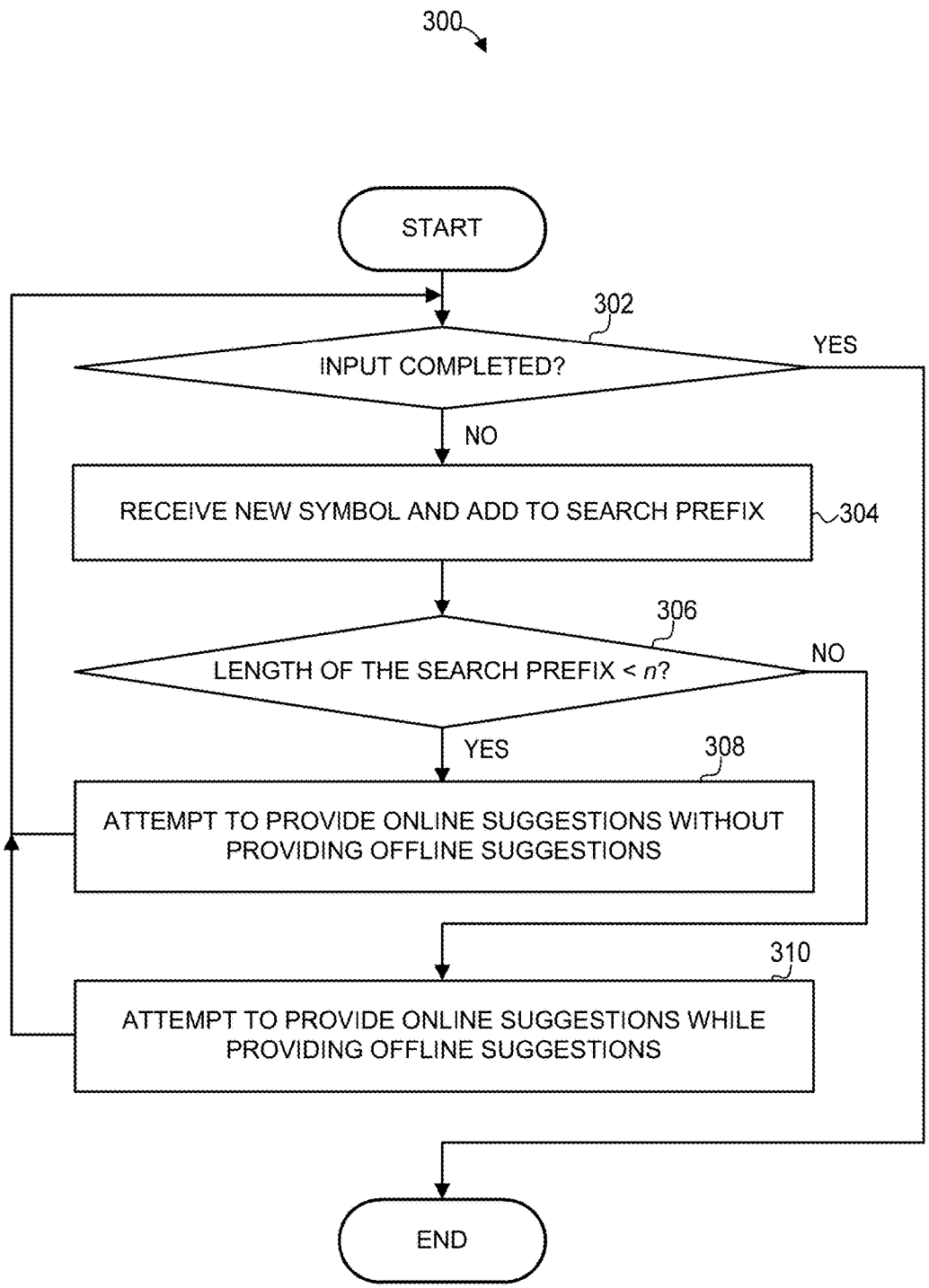
FIG. 4 is a flow diagram of an example method for generating offline suggestions in view of the length of the search prefix.

Now referring to FIG. 4, an example method 300 can be implemented along with the method 200 or separately from the method 200 in the geographic application 110. Similar to the method 200, the method 300 can be implemented as a set of software instructions executable on one or more processors.

The method 300 begins at block 302, where it is determined whether user input has been completed. For example, it can be determined whether the user has actuated the "search" button yet. The input can be a part of a query that includes a geographic query. If input has not yet been completed, a new symbol is received at block 304 and added to the search prefix according to the current input language. In general, a symbol can be a letter, a number, a syllable character, a space or another separator, a word character, a component of a word character, etc. The user can provide the symbol by typing the character, speaking or otherwise referencing the symbol via audio (e.g., voice) input, or in any other suitable fashion. If input has been completed, the method 300 ends.

As a more specific example of audio input, a voice recognition system operating in the client device can generate a transliteration for words, symbols, individual letters, or other units of speech. These units can be send to a network server in a segmented fashion, such as letter-by-letter or word-by-word, or the audio data can be transmitted to the network server for processing, for example.

Next, at block 306, it is determined whether the current length of the search prefix is less than certain number n. Number n can be relatively small, such as 1, 2 or 3, for example, but in general the geographic application can be configured with any desired value of n. If it is determined that the search prefix contains fewer than n symbols, the flow proceeds to block 308. Otherwise, the flow proceeds to block 310.

At blocks 308 and 310, an attempt to provide online suggestions is made in a manner that is generally similar to the approach discussed above with reference to blocks 210-226. Offline suggestions may be more accurate as the prefix length increases, and thus no offline suggestions are provided at block 308 if the search prefix criteria of block 306 is not satisfied. As discussed above, while a network server can utilize a robust set of signals, a large geospatial database, and execute a complex algorithm when necessary, a portable device has only limited access to resources in the offline mode and generally has lower computational ability as compared to a network server. In contrast to block 308, offline suggestions are provided at block 310, where a longer search prefix can be more easily and accurately matched to geospatial terms.

Referring generally to FIGS. 3 and 4, the user in an example scenario invokes the geographic application on a smartphone to search for nearby toy stores. The user activates the geographic search mode of the geographic application and begins to type in the search prefix. After the user types in the first letter, 't,' the geographic application checks availability of a network connection and, based on one or more signals from the operating system of the smartphone, determines that a network connection is available. The geographic application attempts to send a message to a network server via the communication stack of the smartphone. The message includes the current search prefix 't' and, in some implementations, other information such as the user's location, for example. The smartphone sends the message which does not reach the network server with the time period corresponding to the timer. The geographic application does not provide offline suggestions due to the short length of the prefix. The user continues to type in characters, 'o' to augment the search prefix to "to," 'y' to augment the search prefix to "toy," etc., and the geographic application can continue to attempt to obtain online geospatial suggestions, or at least query the operating system to check whether the network connection has become available. When the search prefix has reached three characters, for example, the geographic application generates offline geospatial suggestions for the term "toy." The geographic application also activates a longer timer to allow for the possibility that online geospatial suggestions will arrive at a later time. When several geospatial suggestions finally arrive, the geographic application merges the online and offline suggestions.

Example Screenshots

For additional clarity, several example screenshots of a geographic application are illustrated in FIGS. 5A-D. The geographic application can be, for example, the geographic application 110 that implements one or both methods 200 and 300. In these examples, the value of n is 3.

Figure 5A:
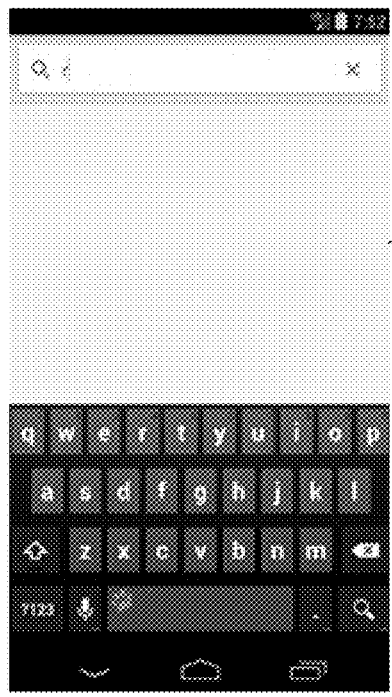
FIG. 5A is an example screenshot which a geographic application of this disclosure can generate when the user enters a short search prefix, and the client device cannot retrieve online search suggestions sufficiently quickly.

A screenshot 402 in FIG. 5A illustrates the situation when the user begins to enter a search prefix and enters the letter "r." In this example, no online search suggestions can be retrieved sufficiently quickly (e.g., within the time interval corresponding to timer T1). Here, the length of the search prefix is one, which is less than the value of n=3 used in this example, and so no offline suggestions are generated.

Figure 5B:
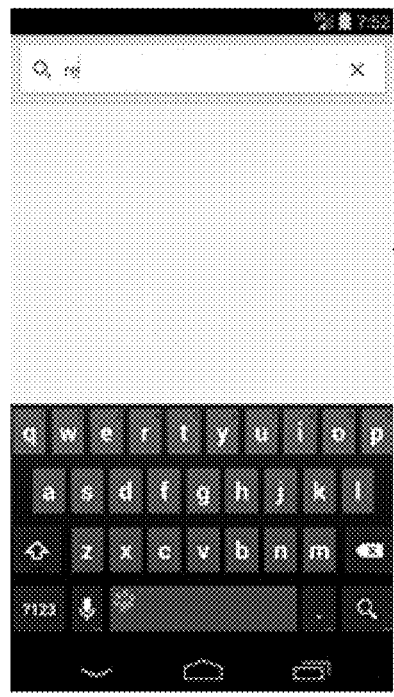
FIG. 5B is an example screenshot which a geographic application of this disclosure can generate when the search prefix is still relatively short, and the client device cannot retrieve online search suggestions sufficiently quickly.

FIG. 5B depicts a screenshot 404, where the user entered another letter to bring the search prefix to "re." Because 2<3, and because no online suggestions can be retrieved in time in this scenario, no offline suggestions are generated.

Figure 5C:
FIG. 5C is an example screenshot illustrating offline suggestions which a geographic application of this disclosure can generate when the search prefix is sufficiently long, and the client device cannot retrieve online search suggestions sufficiently quickly.

When the user enters another letter to make the search prefix "res," but online suggestions are not received sufficiently quickly, several offline suggestions are generated and displayed, as illustrated in screenshot 406 in FIG. 5C.

Figure 5D:
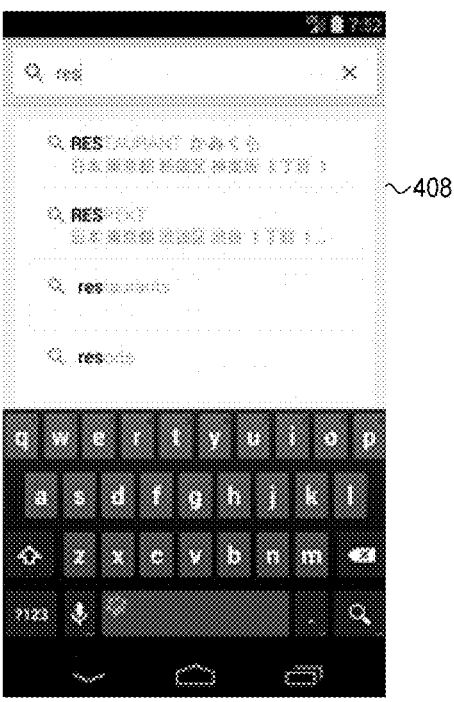
FIG. 5D is an example screenshot illustrating merged online and offline suggestions which a geographic application of this disclosure can generate when online search results arrive shortly after the geographic application displays offline suggestions.

Screenshot 408 in FIG. 5D illustrates a merger of online suggestions with offline suggestions. Here, online suggestions arrived after the shorter timeout expired but before a longer timeout expired (e.g., the timeout corresponding to timer T2 discussed above). Accordingly, while the search prefix remains the same ("res"), several online suggestions are added to the list of offline suggestions.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of various implementations. This description should be read to include one or at least one and the singular also includes the plural unless it is obvious that it is meant otherwise.

Upon reading this disclosure, those of ordinary skill in the art will appreciate still additional alternative structural and functional designs for merging online geospatial suggestions with offline geospatial suggestions through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for integrating offline and online suggestions, the method comprising:
   receiving, by one or more processors via a user interface, an initial sequence of one or more symbols;
   attempting to send, by the one or more processors, a request for online suggestions to a network server via a communication network, the request including at least one symbol in the initial sequence;
   in a first instance, when it is determined that the initial sequence is less than n symbols long, wherein n is a positive integer:
      if no response to the request is received from the network server, displaying the initial sequence without generating offline suggestions,
   in a second instance, when it is determined that the initial sequence is at least n symbols long:
      when no response to the request is received from the network server within a predetermined period of time corresponding to a first timer, (i) generating, by the one or more processors, offline suggestions based at least in part on the initial sequence using offline geospatial data, including retrieving the offline geospatial data from a memory of the computing device, (ii) activating a second timer upon generating the offline suggestions, and (iii) providing the offline suggestions via the user interface, and
      when the online suggestions are received within a second time period corresponding to the second timer, merging, by the one or more processors, the online suggestions with the offline suggestions.

2. The method of claim 1, further comprising:
   updating, by the one or more processors, the user interface based on the merging.

3. The method of claim 1, wherein merging the online suggestions with the offline suggestions includes:
   identifying, by the one or more processors, one of the online suggestions that corresponds to one of the offline suggestions, and
   updating the user interface based at least in part on the result of the merging.

4. The method of claim 1, wherein the second period of time is longer than the first period of time.

5. The method of claim 1, wherein providing the offline suggestions via the user interface includes providing an interactive control via the user interface, the method further comprising:
   in response to the interactive control being actuated, (i) re-activating the second timer and (ii) re-attempting to send the request for online suggestions to the network server.

6. The method of claim 1, further comprising:
   when the search initial sequence is less than n symbols long:
      determining, by the one or more processors, whether the portable computing device currently has network connectivity,
      in response to determining that the portable computing device currently has network connectivity, activating a timer for the predetermined period of time, wherein the timer is not activated if it is determined that the portable computing device currently has no network connectivity.

7. The method of claim 1, wherein attempting to send the request for suggestions includes attempting to send a new instance of the request each time the initial sequence is augmented with a new received symbol.

8. The method of claim 1, further comprising providing, via the user interface, an offline indicator to notify the user that the generated offline suggestions were not received from the network server.

9. The method of claim 1, further comprising:
   receiving an acknowledgement of the request from the network server, without receiving the response to the request; and
   in response to the acknowledgement, extending the period of the first timer.

10. The method of claim 1, wherein merging the online suggestions with the offline suggestions includes:
    receiving additional data for one of the generated offline suggestions, and
    expanding the offline suggestion provided with the user interface with the additional data.

11. The method of claim 10, wherein the offline suggestion corresponding to a name of a geographic entity, and wherein the additional data includes a spelling of the geographic entity in another language.

12. The method of claim 1, further comprising storing, for a certain offline suggestion, an indication that the offline suggestion is reliable and does not require an update with an online suggestion.

13. A method in a portable computing device for integrating offline and online suggestions, the method comprising:
    receiving, by one or more processors via a user interface, an initial sequence of one or more symbols;
    determining, by the one or more processors, a current length of the initial sequence;
    attempting to send, by the one or more processors, a request for suggestions to a network server, the request including the initial sequence;

activating, by the one or more processors, a first timer upon attempting to send the request for suggestions;

when the first timer expires prior to receiving a response to the request:
- (i) in a first instance, in response to determining that the current length of the initial sequence is at least n symbols, wherein n is a positive integer, generating, by the one or more processors, offline suggestions based at least in part on the initial sequence using offline data stored in the computing device, in a second instance, in response to determining that the current length of the initial sequence is less than n symbols, not generating the offline suggestions, and
- (ii) activating a second timer; the method further comprising:

if the requested suggestions arrive from the network server before the second timer expires, merging, by the one or more processors, the requested online suggestions with the offline suggestions.

14. The method of claim 13, wherein merging the online suggestions with the offline suggestions includes:
identifying, by the one or more processors, one of the online suggestions that corresponds to one of the offline suggestions, and the method further comprising:
updating, by the one or more processors, the user interface based on the merging.

15. The method of claim 13, wherein the second period of time is longer than the first period of time.

16. The method of claim 13, wherein providing the offline suggestions via the user interface includes providing an interactive control via the user interface, the method further comprising:
in response to the interactive control being actuated, (i) re-activating the second timer and (ii) re-attempting to send the request for online suggestions to the network server.

17. The method of claim 13, wherein attempting to send the request for suggestions includes attempting to send a new instance of the request each time the initial sequence is augmented with a new received symbol.

18. A portable computing device comprising:
one or more processors;
a user interface;
a network interface to communicatively couple the portable computing device to a network server via a communication network, in an online mode;
a non-transitory computer-readable memory coupled to the one or more processors and storing thereon a geographic application configured to:
receive, via the user interface, an initial sequence of one or more symbols including a sequence of one or more symbols,
determine a current length of the initial sequence,
attempt to send a request for suggestions to the network server, the request including the initial sequences,
activate a first timer upon attempting to send the request for suggestions,
if the first timer expires prior to receiving a response to the request, (i) in a first instance, in response to determining that the current length of the initial sequence is at least n symbols, wherein n is a positive integer, generate offline suggestions consistent with the initial sequence using offline data stored in the computing device, and in a second instance, in response to determining that the current length of the initial sequence is less than n symbols, not generate the offline suggestions, and (ii) activate a second timer, and
if the requested suggestions arrive from the network server before the second timer expires, merge the requested online suggestions with the offline suggestions.

19. The portable computing device of claim 18, wherein to merge the online suggestions with the offline suggestions, the geographic application is configured to:
identify one of the online suggestions that corresponds to one of the offline suggestions, and wherein the geographic application is further configured to
update the user interface based on the merging.

20. The portable computing device of claim 18, wherein to provide the offline suggestions via the user interface, the geographic application is further configured to:
provide an interactive control via the user interface,
in response to the interactive control being actuated, (i) re-activate the second timer and (ii) re-attempt to send the request for online suggestions to the network server.

* * * * *